United States Patent [19]
DeMars

[11] Patent Number: 5,967,024
[45] Date of Patent: Oct. 19, 1999

[54] JUICE REMOVAL FRYING PAN

[76] Inventor: Robert A. DeMars, 23221 Ladrillo Ave., Woodland Hills, Calif. 91367

[21] Appl. No.: 09/292,033

[22] Filed: Apr. 16, 1999

[51] Int. Cl.[6] .............................. A47J 37/00; A47J 37/10
[52] U.S. Cl. ................................ 99/425; 99/400; 99/446; 126/376; 126/390
[58] Field of Search ..................... 99/339, 340, 422–425, 99/375, 400, 444–446, 447, 450; 126/373, 376, 390, 377, 275 R; 220/771, 912; 426/520, 523

[56] References Cited

U.S. PATENT DOCUMENTS

| | | | |
|---|---|---|---|
| 216,346 | 6/1879 | Read | 99/425 |
| 1,351,285 | 8/1920 | Chess . | |
| 1,447,813 | 3/1923 | Patrick | 126/390 X |
| 1,733,450 | 10/1929 | Detwiler . | |
| 1,777,940 | 10/1930 | Stough | 99/400 X |
| 2,413,204 | 12/1946 | Wolff | 99/425 |
| 2,579,258 | 12/1951 | Heckert . | |
| 3,283,696 | 11/1966 | Randolph | 99/446 X |
| 3,847,068 | 11/1974 | Beer et al. . | |
| 3,994,211 | 11/1976 | Stanek | 99/375 X |
| 4,574,777 | 3/1986 | Bohl et al. | 126/390 |
| 5,323,693 | 6/1994 | Collard et al. | 99/445 X |
| 5,595,108 | 1/1997 | Sheu | 220/912 X |
| 5,845,562 | 12/1998 | Deni et al. | 99/375 |
| 5,884,555 | 3/1999 | Chang | 99/425 |

FOREIGN PATENT DOCUMENTS

| | | |
|---|---|---|
| 2507461 | 12/1982 | France . |
| 742484 | 12/1955 | United Kingdom . |

*Primary Examiner*—Timothy Simone
*Attorney, Agent, or Firm*—Jack C. Munro

[57] ABSTRACT

A juice removal frying pan which includes an inclined narrow channel formed within the internal chamber of the frying pan. The internal channel has an inlet and an outlet with the inlet being located at the frying surface and the outlet located directly adjacent the upper free edge of the upstanding sidewall of the frying pan. By slight tilting and pivoting of the frying pan, the juice can be caused to flow from the inlet to the outlet to then be dispensed exteriorly of the frying pan.

8 Claims, 2 Drawing Sheets

JUICE REMOVAL FRYING PAN

BACKGROUND OF THE INVENTION

1) Field of the Invention

This invention relates generally to a frying pan which is constructed to provide a simple way to remove juice, that is produced in the cooking of food, away from the food and be dispensed exteriorly of the frying pan without tilting of the frying pan to such an extent that the foodstuff is able to become dislodged.

2) Description of the Prior Art

Within recent years there has been a requirement by a great number of people to reduce cholesterol and fat within food intake. Meat items generally have a tendency to release a comparatively large quantity of fat upon frying. The fat becomes liquid during the frying operation. When using the conventional top of the stove frying pan, the fat accumulates at the bottom of the pan. This fat forms a liquid layer in the pan and this fat gets deeper and deeper as the frying process continues. As a result, the food item becomes soaked in the liquid fat and eating such food is notoriously detrimental to the consumer's body.

Several attempts have been made, in the past, to design a low fat frying pan. A common form of such a design is a frying pan where the frying chamber includes a grease gutter located therein. The purpose is for the juice which includes grease and other liquids to collect within the gutter which is spaced from the area of where the food is being cooked. One of the disadvantages of such a frying pan is that frequently the amount of juice that is produced is greater than the volume of the gutter which results again in the food being cooked while being soaked within grease.

Another design is to provide for merely tilting of the frying pan and draining the frying chamber of juice during the cooking process. This draining may occur a plurality of times during the cooking process. One of the major disadvantages of this operation is that in order to affect the draining operation the frying pan has to be tilted to an almost vertical position which means that the food that is being cooked has a tendency and frequently does fall from the frying chamber. As a result, the food may fall on the floor or on the countertop, and in both instances, creates an unslightly mess and possibly contaminates the food with dirt or germs.

There has also been known to use a rib type of frying pan with the idea that the food is placed atop the ribs during the cooking operation. The juice is to drain away from the food and be conducted into the grooves between the ribs. One disadvantage of this type of frying pan is that only a fraction of the cooking surface is in contact with the food item which results in a much increased time and a lack of crispness of the fried item.

SUMMARY OF THE INVENTION

A primary objective of the present invention is to provide a frying pan on which liquid fat released from the food is easily removable from the frying chamber and dispensable exteriorly of the frying pan.

Another objective of the present invention is to provide a frying pan similar in shape to a conventional frying pan which can be used by the average homeowner atop conventional gas or electric stoves.

Another objective of the present invention is to construct a frying pan which is able to remove grease and other liquids during the cooking operation of food which can be manufactured economically and thereby sold to the ultimate consumer at an economical price.

The juice removal frying pan of the present invention is constructed in a manner similar to conventional frying pans in that is has an internal chamber defined as a frying pan chamber which has a flat bottom, the internal surface of which comprises the frying surface. Totally surrounding the flat bottom is an upstanding sidewall which defines an upper free annular edge that is spaced a constant distance from the bottom of the frying pan. A handle is attached to the frying pan and is to be usable to facilitate manual movement of the frying pan to and from the heat source. Included within the frying pan chamber is an arcuate inclined ramp that is located directly against the upstanding sidewall. This inclined ramp has an inlet and an outlet with the inlet located directly adjacent the handle and connecting with the frying surface. The outlet is about two hundred seventy degrees from the inlet and is located directly adjacent the upper free edge of the upstanding wall. During the cooking operation the user can slightly tilt the frying pan causing the juice to flow in the area of the inlet, and then by pivoting of the frying pan about the total of two hundred seventy degrees, the juice can be caused to flow up the ramp and be dispensed from the ramp at the outlet. The removal of the juice from the foodstuff is accomplished by only slightly tilting (about seven degrees) of the frying pan thereby eliminating the possibility of the foodstuff to fall from the frying chamber.

DETAILED DESCRIPTION OF THE PREFERRED EMBODIMENT

Figure 1:
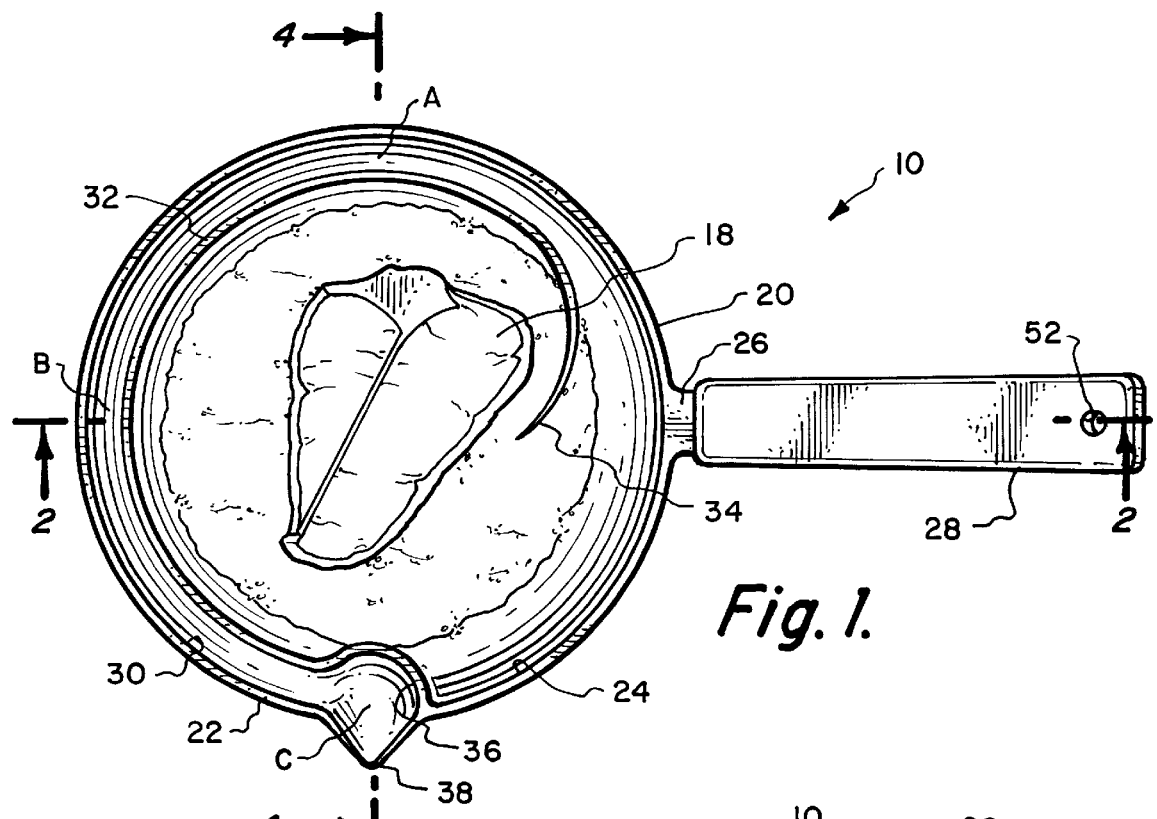
FIG. 1 is a top plan view of the frying pan constructed in accordance with this invention showing the frying pan being used to cook a piece of meat.

Referring particularly to the drawings, there is shown the frying pan 10 of this invention. Frying pan 10 is composed of a flat bottom 12 having an exterior surface 14 and an interior surface 16. The interior surface 16 is the same as the frying surface. The foodstuff 18 is to be located on this frying surface. It is to be understood that the entire frying pan 10 is to be constructed of a metallic material such as aluminum or iron or any other metal or alloys of metal that facilitate the conducting of heat.

Integrally connected to the flat bottom 12 and located at the periphery of the flat bottom 12 is an upstanding sidewall 20. The upstanding sidewall 20 has an upper free annular edge 22. The upstanding sidewall 20 defines the exterior side limit of the frying chamber 24. A handle 26 is integral with the upstanding sidewall 20 with the handle 26 extending outwardly from the upstanding sidewall 20. Mounted on the handle 26 is a resilient non-heat conductive cover 28. Typically the cover 28 will be constructed of a plastic or a rubber type of material.

Formed within the frying pan 10 and located within the frying chamber 24 is a channel 30. The channel 30 is located directly adjacent the upstanding sidewall 20 with the channel's inner surface being defined by inner wall 32. The channel 30 basically comprises an inclined arcuate ramp. The channel 30 has an inlet 34 which is located directly adjacent the handle 26, but of course within the frying chamber 24 with the handle 26 being exteriorly of the frying chamber 24. The channel 30 includes an outlet 36 which is defined by a pour spout 38 which is located directly adjacent the upper free annular edge 22. Therefore it can be seen that the depth of the channel 30 is greatest at the inlet 34 and is the least at the outlet 36. The inner wall 32 also is of the greatest heighth at the outlet 36 which is substantially equal to the heighth of the upper free annular edge 22. The heighth of the inner wall 32 is only slightly above the interior surface 16 at the inlet 34. The pour spout 38 is located about two hundred seventy degrees spaced from the inlet 34 or the handle 26.

Figure 3:
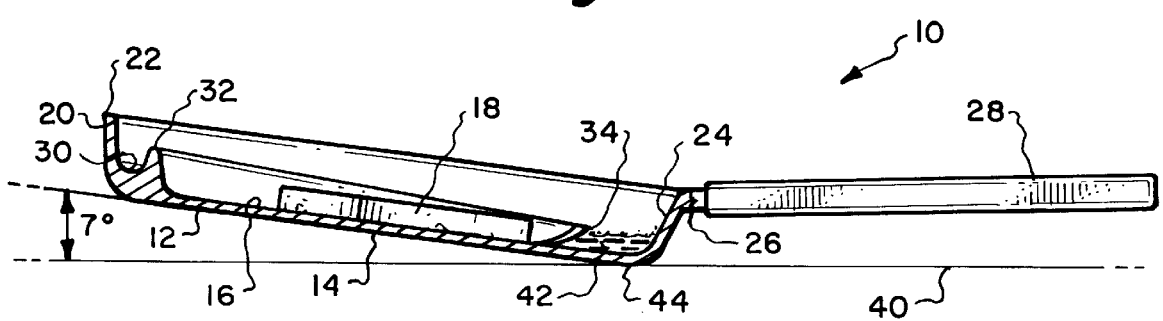
FIG. 3 is a view similar to FIG. 2 but showing the frying pan being tilted to cause the juice to flow in the area of the inlet of the inclined ramp.
Figure 4:
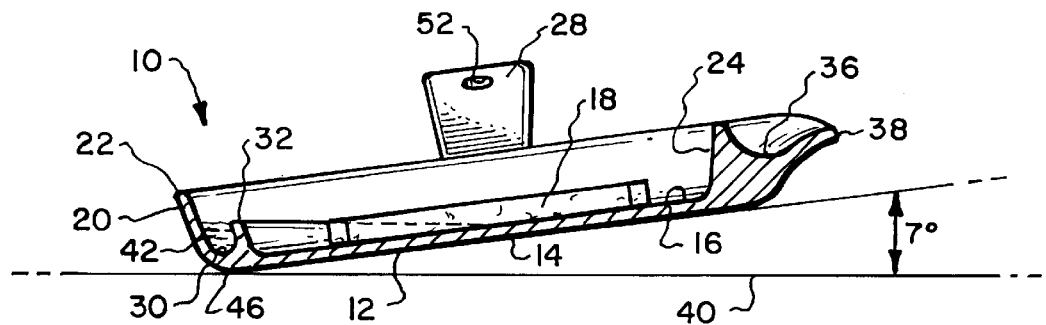
FIG. 4 is a cross-sectional view taken at a right angle relative to the cross-sectional view of FIG. 2 taken along line 4—4 of FIG. 1 again showing the frying pan in a tilted position where the juice is caused to flow up the inclined ramp.
Figure 5:
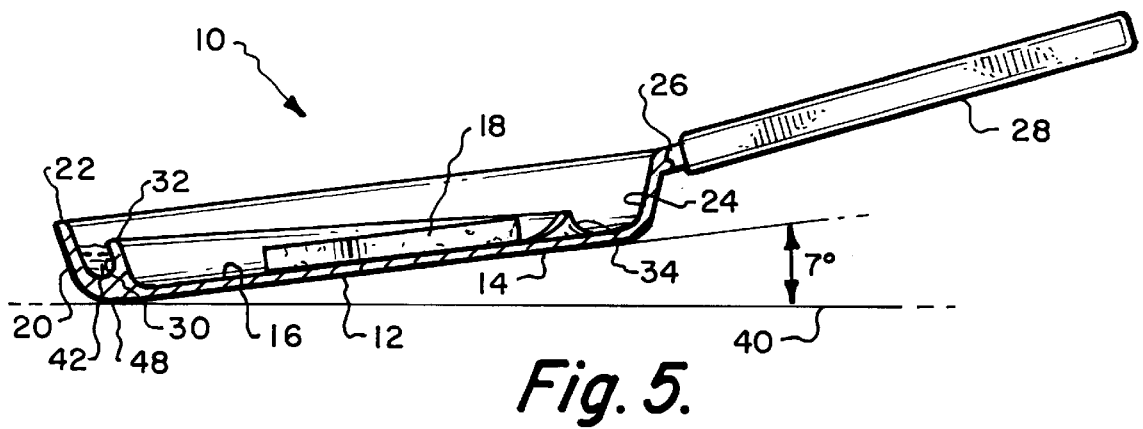
FIG. 5 is a cross-sectional view similar to FIG. 3 but with the frying pan in a forward tilting position with the juice approaching the outlet of the inclined ramp.
Figure 6:
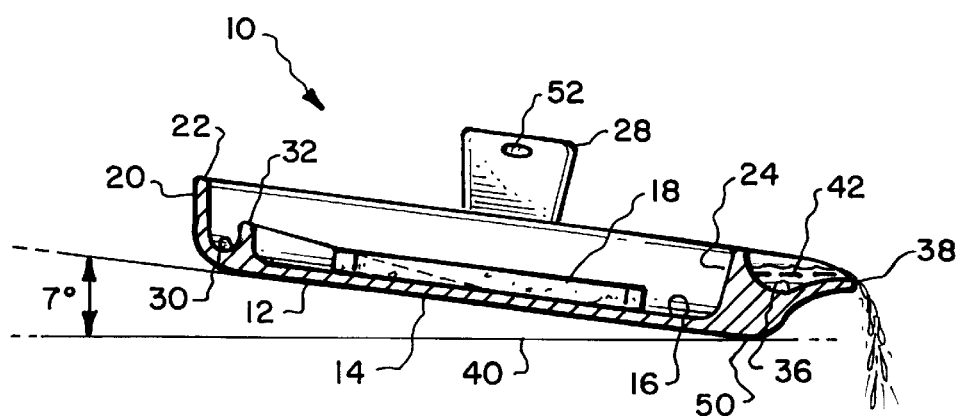
FIG. 6 is a cross-sectional view similar to that of FIG. 4 but showing the frying pan in an oppositely tilted position with the juice then being dispensed from the outlet of the inclined ramp.

The operating procedure for the frying pan 10 of this invention is as follows: The exterior surface 14 is to be placed flat against a heat source which is defined generally as line 40. It is to be understood that this heat source could be electric or gas. As the foodstuff 18 is cooked, there is secreted juice which frequently are composed of water and fat (grease). The juice 42 could also include cooking oil which is applied to the frying surface prior to inserting of the foodstuff 18 thereon to be cooked. As the juice 42 accumulates and when there is sufficient amount that is desired to be removed, the user grasps the resilient cover and tilts the frying pan in a rearward direction about seven degrees, as is clearly shown in FIG. 3. This causes the juice 42 to accumulate at the inlet 34. The user then proceeds to pivot and turn the frying pan from point 44, shown in FIG. 3, to point 46, shown in FIG. 4. What has occurred is that the juice 42 has been cause to flow to point A of the frying pan 10. From point 46 the frying pan is further pivoted and turned still keeping the tilted angle of the frying pan at about seven degrees to point 48 located in FIG. 5. The juice has now moved within the channel 30 to point B. The user then continues to pivot and turn the frying pan 10 still maintaining about seven degrees of tilt until the flat bottom 12 is in contact with the line 40 at point 50. The juice 42 is now located at point C, which is at the outlet 36 and directly adjacent the pour spout 38. A slight increase in the tilt angle of no more than a couple of degrees will result in the juice pouring from the pour spout 38.

Figure 2:
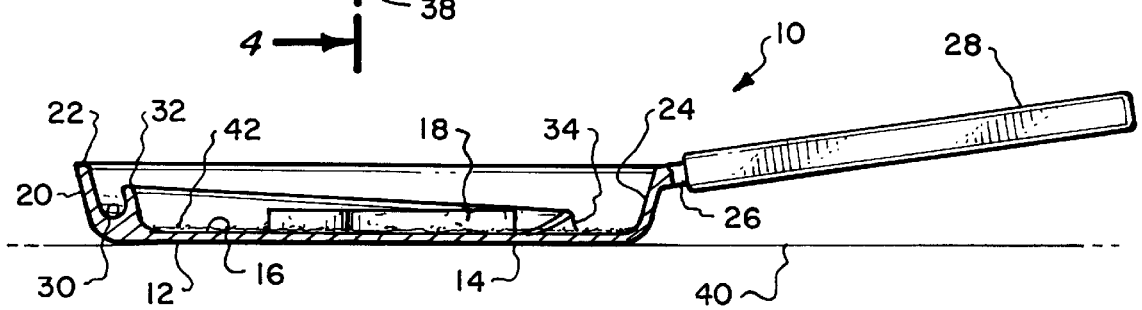
FIG. 2 is a cross-sectional view through the frying pan of the present invention taken along line 2—2 of FIG. 1.

Generally, the juice 42 will be poured into some form of a collecting container, which is not shown. Once the juice 42 has been dispensed from the frying pan 10, the frying pan 10 can then be relocated on the heat source shown generally by line 40 in a flat configuration as is shown in FIG. 2 of the drawings or removed from the heat source if the foodstuff is totally cooked. It is to be noted that at no time was the tilting of the frying pan 10 at a great enough angle to cause the foodstuff 18 to be dislodged from the frying chamber 24, and in most cases will not even be great enough to even cause the foodstuff 18 to even move on the interior surface 16. The handle 26 and the resilient cover 28 will normally also include a hole 52 to facilitate hanging of the frying pan 10 on some type of a hanging fastener, which is not shown, when the frying pan is not in use.

What is claimed is:

1. A juice removal frying pan comprising:

said frying pan having an internal chamber which has a substantially flat base, said flat base having an interior surface and an exterior surface, said interior surface surrounded by a circumferential upstanding sidewall, said upstanding sidewall having an upper free edge, said exterior surface adapted to be placed against a source of heat, said interior surface adapted to have a foodstuff located thereon to be cooked by the source of heat; and a juice removing narrow channel having an inlet and an outlet, said juice removing narrow channel being located within said internal chamber, said juice removing narrow channel being arcuate shaped, said inlet being located directly adjacent said interior surface, said outlet being located directly adjacent said upper free edge, whereby said frying pan is to be manually tilted a slight amount to a tilted angle to cause juice produced from cooking to enter said inlet and then while maintaining substantially the tilted angle pivot said frying pan causing said juices to flow to said outlet to be dispensed exteriorly of said frying pan.

2. The juice removal frying pan as defined in claim 1 wherein:

said upstanding sidewall being annular.

3. The juice removal frying pan as defined in claim 1 wherein:

a handle being attached to said upstanding sidewall, said handle to be manually used by the user for tilting of said frying pan to said tilted angle.

4. The juice removal frying pan as defined in claim 1 wherein:

said tilted angle being approximately seven degrees.

5. The juice removal frying pan as defined in claim 3 wherein:

said inlet being located directly adjacent said handle.

6. The juice removal frying pan as defined in claim 1 wherein:

said channel comprises an inclined ramp.

7. The juice removal frying pan as defined in claim 1 wherein:

said outlet being approximately two hundred seventy degrees from said inlet.

8. The juice removal frying pan as defined in claim 1 wherein:

said channel being located directly against upstanding sidewall.

\* \* \* \* \*